Dec. 8, 1964     U. M. W. BARSKE     3,160,418
SPRING-LOADED SEAL WITH COAXIAL RELATIVELY
ROTATING CONTACT FACES
Filed April 4, 1961                     3 Sheets-Sheet 1

Dec. 8, 1964
U. M. W. BARSKE
SPRING-LOADED SEAL WITH COAXIAL RELATIVELY
ROTATING CONTACT FACES 3,160,418

Filed April 4, 1961

Ulrich Max Willi Barske Inventor
By Cushman, Darby & Cushman
Attorneys

United States Patent Office 3,160,418
Patented Dec. 8, 1964

3,160,418
SPRING-LOADED SEAL WITH COAXIAL RELATIVELY ROTATING CONTACT FACES
Ulrich Max Willi Barske, An der Klinge,
Altneudorf, near Heidelberg, Germany
Filed Apr. 4, 1961, Ser. No. 100,600
Claims priority, application Great Britain, Apr. 14, 1960,
13,471/60
11 Claims. (Cl. 277—90)

The invention relates to rotary contact seals for sealing relatively rotatable members and comprising two cooperating relatively rotatable seal rings which are adapted to be pressed into sealing contact by axial forces and slide one on the other.

Such seals are used for example as shaft seals, one of the rings being rigidly connected with one of the relatively rotatable members, say the shaft, and the other ring (hereinafter termed "the axially movable seal ring") being connected to the other of the helatively rotatable members, say the casing, so as to have a limited freedom of axial movement in order to be capable of following axial displacements of the shaft.

Such a flexible seal arrangement is generally aimed at in axial seals of the kind to which the invention relates and a great deal of inventive endeavour has been exercised with the aim of producing an effective seal of this type.

Three basic requirements are involved, viz:

(1) Leakproof connection must be maintained between the axially movable seal ring and the relatively rotatable member which carries it, whether this be the casing or the shaft;

(2) the axially movable seal ring must be so arranged that it can accommodate itself as far as possible to any untrue running of the mating seal ring;

(3) The said connection must be sufficiently strong to resist the pressure differential between the two sides of the seal, especially when the seal is required for use with medium or high fluid pressures, e.g., pressures above 50 lbs. sq. in.

If there is no pressure differential or a low pressure differential as is the case in many applications, the requirements (1) and (2) can be readily satisfied and the requirement (3) is not important, but when medium and high fluid pressures are involved the connection has to be made so strong that the flexibility suffiers badly and this is accompanied by an increasing internal friction. Provision is generally made for balancing the higher fluid pressures to some extent so as to avoid excessive contact pressure between the rings. The balancing means, however, are effective only if the aforesaid connection between the axially movable seal ring and the casing or other part to which it is secured is sufficiently flexible and free from friction and in this respect existing designs cannot be considered as satisfactory and the contact pressures between the sliding surfaces of the seal are therefore more or less out of control at medium or high fluid pressures.

The present invention aims at providing between one of the relatively rotatable members and the axially movable seal ring a connection which is nearly free of mechanical friction and the flexibility of which is largely independent of the pressure differential. Furthermore the invention aims to provide a connection so designed that a reliable mathematical treatment can be applied to determining its elastic properties, and consequently a strict control of the contact pressure between the co-operating sliding seal rings is obtainable for all operating conditions. Another important aim is to achieve a seal of a small axial extent which is also widely independent of the magnitude of the fluid pressure to be sealed. The improved seal may therefore be designed to permit of reducing the shaft length.

With these aims in view, in the improved rotary contact seal according to this invention, the axially movable seal ring is radially controlled by a circumferential set, or by one of two or more axially-interconnected circumferential sets, of juxtaposed leaf springs which have their outer ends fixed and their inner ends free from one another so that they can act as beams fixed at one end and diaphragm sealing means supported by the, or each set of, springs for sealing the said ring to one of the said members or to a ring fixable thereto, but such as will leave the control of the elastic flexibility of the seal substantially to the said springs.

By "juxtaposed" we mean that adjacent edges of the springs are in contacting or near relationship. The presence of the leaf springs supporting the diaphragm enables a highly flexible diaphragm to be used since its function is merely that of sealing and little or no regard need be had to it in calculating the elastic properties which will ensure correct contact pressures between the seal rings for the estimated fluid pressures.

The seal may have a single set of springs and a single co-operating diaphragm, the inner free ends of the springs radially supporting the axially movable seal ring to which the inner periphery of the diaphragm is sealed and the outer ends of the springs being fixed, and the outer periphery of the diaphragm sealed, to the said member or a ring fixable thereto.

However, the spring system may be of compound form, i.e., comprise two or more spring sets each with a co-operating diaphragm. An odd number of said spring sets may be provided each with a co-operating sealing diaphragm, interconnected by and sealed to further axially movable rings, so that the inner free ends of the springs radially support inner axially movable rings (one of which is the axially movable seal ring) and the outer ends of the springs are fixed to one or more outer axially movable rings save for the end set remote from that radially supporting the axially movable seal ring, which set is fixed to the said member or to a ring fixable thereto.

Alternatively, two spring sets each with a co-operating diaphragm may be interconnected by and sealed to an axially movable inner ring so that the inner free end of the springs radially support said inner ring and the outer ends of the springs of one set are fixed to the axially movable seal ring and of the other set to the said member or to a ring fixable thereto.

Still preserving an even number of spring sets and diaphragms at least two further sets of springs and diaphragms intermediate the first two (just referred to) and at least one further outer axially movable ring and at least one further inner axially movable ring may be provided, the outer ends of the springs of said intermediate sets being fixed to said further outer ring or rings and the free inner ends of the springs of the several sets radially supporting the inner axially movable rings.

Whether the outer ends of a single spring set are fixed to a fixed member such as the casing of the apparatus or to an outer axially movable ring balanced by the fluid forces, the outer end portions must be positively constrained against flexure so that the springs will function, as shown in FIG. 3 of the accompanying drawings (hereinafter referred to).

The springs should deviate very little from the straight line when the shaft occupies its normal axial position so as to avoid tendency to snap although they may be slightly preformed in order to give a light pre-load to the axially movable seal ring when in the position as shown for example in FIG. 1 of the drawings.

The fluid pressure applied through the springs may produce the contact pressure against the opposition of the opposing force on the axially movable seal ring, or vice versa.

Provision may be made for retaining the axially movable seal ring and the one of the relatively rotatable members to which it is connected from relative rotary movement.

In certain forms of the seal, the axially movable seal ring may be made up of component rings comprising one ring component having a hub section and a radial flange section and another ring component which is fluid-tightly fixed to the said flange and provides the contact seal face of the said ring concentrically between the inner and outer edges of the free portion of the diaphragm and so that the radial flange provides an annular face to which the fluid under pressure can have access to oppose the resultant fluid pressure applied through the diaphragm and springs.

The spring sections may be separate elements or they may project radially inwards from a continuous outer ring and be of truncated sector-like form separated from one another by radial slits or narrow slots, their free ends being arranged to bear on and radially support the axially movable seal ring or the other inner axially movable ring or rings, when present.

To promote the flexing action of the springs without tendency to flex otherwise than in the intended direction the outer supports from which the springs flex may be tangential linear supports, e.g., each formed by the side of a polygonal edge provided by the ring to which the outer ends of the springs are fixed. Alternatively the said supports may be provided by a series of cylinders, rounded rods or needles or the like together defining a straight-sided polygon.

The springs may have straight inner edges, e.g., formed by tangentially truncating the sector like springs previously referred to, which are arranged to bear on straight supports formed by the axially movable ring they radially support. Where more than one spring set is provided each leaf spring of each set may be supported as before described. The leaf spring may be of laminate form.

The springs may be made stiffer in the region thereof adjacent to the outer supports about which they flex, e.g., by providing additional blade springs fixed adjacent each spring section to extend within the said supports.

The springs at the outer fixed ends may be clamped with the corresponding margin of the diaphragm but this is not essential since the margin of the diaphragm may be separately secured, e.g., by turning the said margin towards the axis of the seal and holding it by a peened lip.

The inner periphery of the diaphragm may be held and sealed by providing it with a curved lip secured by a garter spring in an annular groove in the ring to which it is to be connected and sealed. Or a separate ring may secure or clamp an axial flange projecting from the inner periphery of the diaphragm to the corresponding ring.

In order that the invention may be the more readily understood, reference is hereinafter made to the several forms of construction thereof illustrated by way of example in the accompanying drawings, in which.

Figure 1:
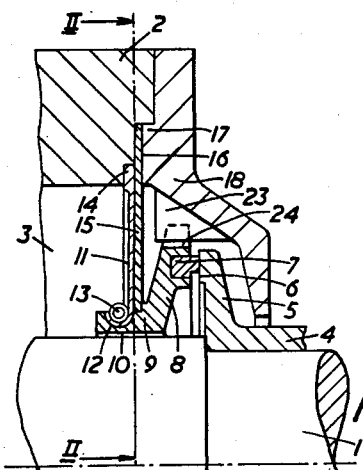
FIG. 1 is a longitudinal section through a rotary shaft seal.
Figure 6:
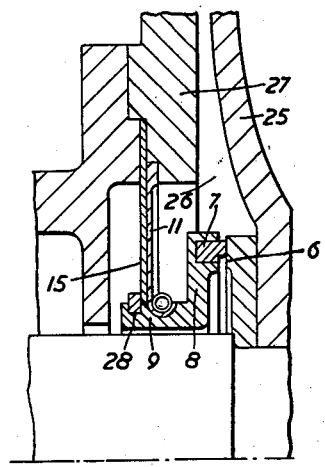
Figure 3:
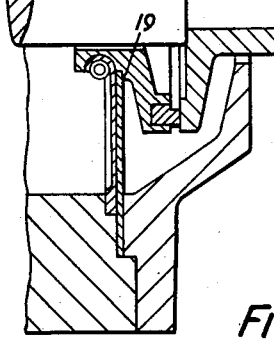
Figure 4:
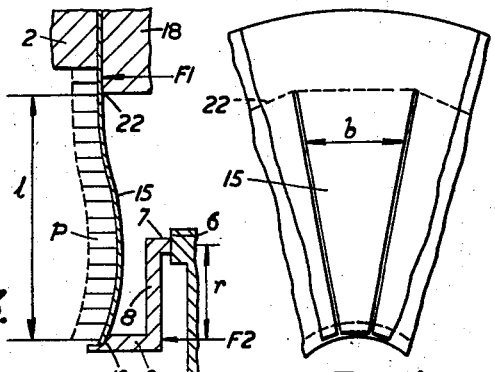
Figure 5:
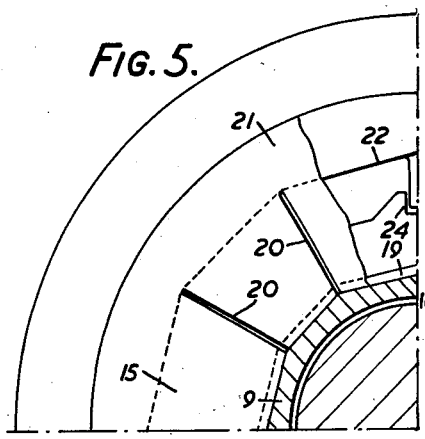
Figure 2:
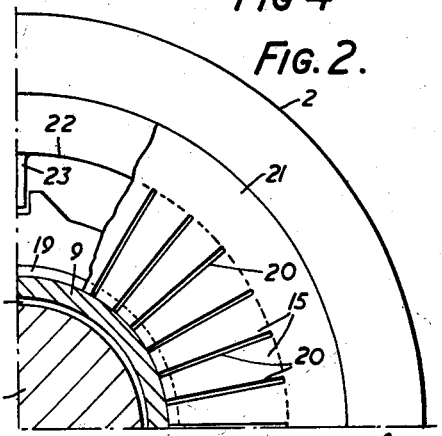
FIG. 2 is a section II—II of FIG. 1.
Figure 7:
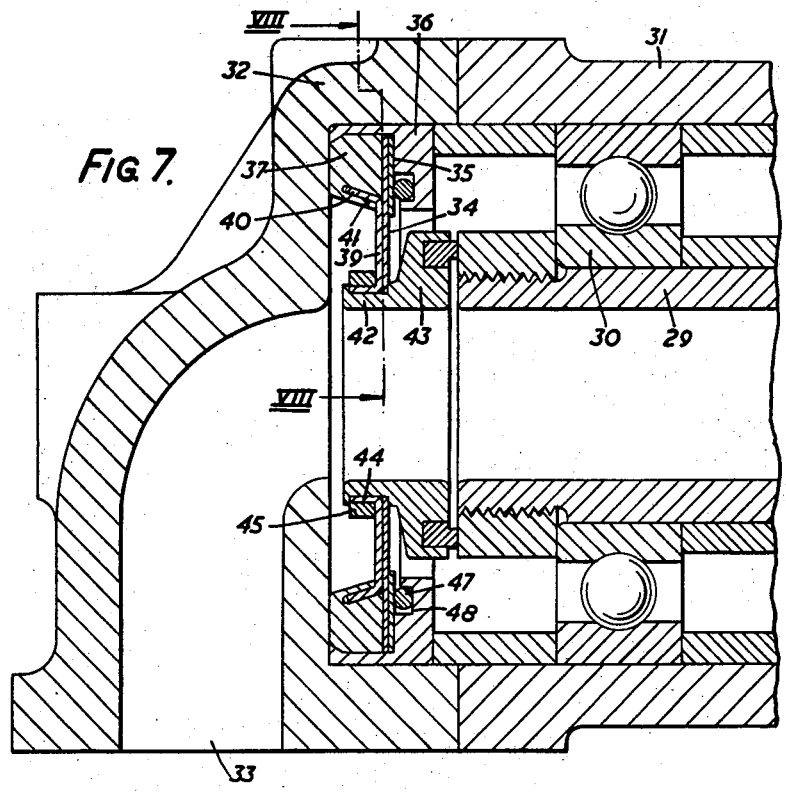
Figure 8:
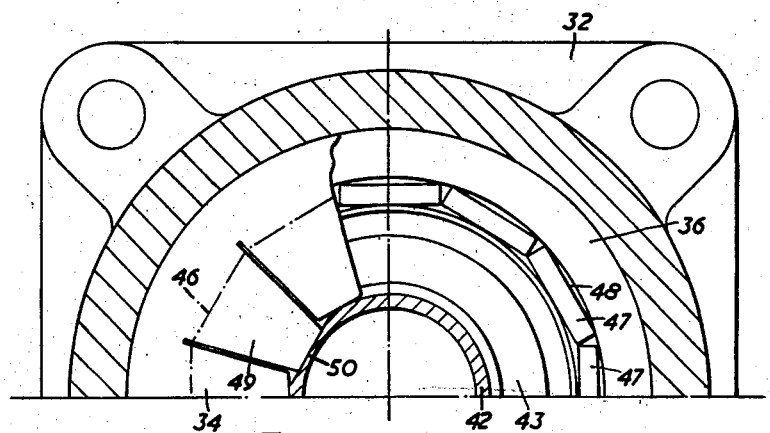
Figure 9:
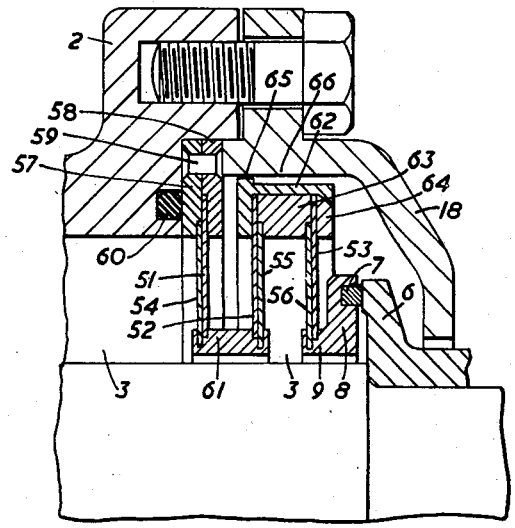
Figure 10:
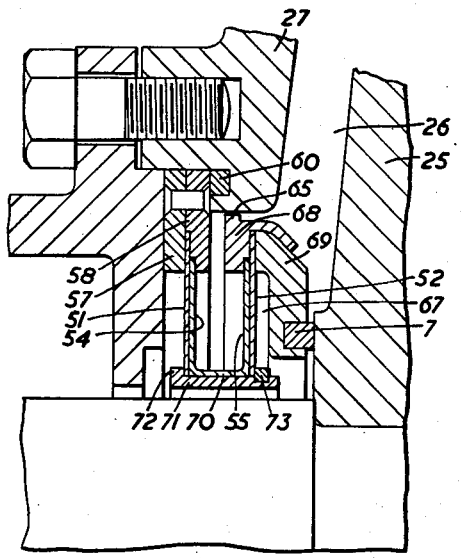

FIG. 3 is a diagram of a single leaf spring section in connection with the axially movable ring, FIG. 4 is a plan view showing the shape of the leaf spring section, FIG. 5 shows the same section II—II of FIG. 1 as FIG. 2 but with wider leaf spring sections, FIG. 6 is a slightly modified design in which the fluid pressure acts on the diaphragm to tend to move the axially movable ring away from the cooperating ring, FIG. 7 shows a longitudinal section of a rotary pipe union supplied with a seal according to the invention, FIG. 8 shows end views to FIG. 7 (in general section VIII—VIII), FIG. 9 is a part sectional elevation of a modified rotary shaft seal, and FIG. 10 is a part section of another modification.

Referring to FIGS. 1 and 2, the rotary shaft 1, being one of the relatively rotatable members previously referred to, extends into a stationary casing 2 (being the other member) the interior 3 of which may be filled with a pressurised fluid. A sleeve ring 4 integral with a flange portion 5 is fixed to the shaft 1, the flange 5 being provided at its periphery with the rotary sealing face 6. The co-operating sealing ring 7 is tightly fixed at the periphery of a non-rotating ring which consists of the flange portion 8 and the hub portion 9 through the bore of which the shaft 1 extends with an ample radial clearance 10, the ring 7, 8 and 9 being in this case the axially movable seal ring previously referred to. The inner edge of a flat diaphragm 11 of flexible material located on the pressure side of the springs 15 (hereinafter described) is tightly fixed to the hub 9, the fluid-tight connection being obtained, by way of example, by means of a pre-moulded edge 12 of the diaphragm 11 fitting into a half circular groove of the hub 9 and pressed against the surface of the groove by a garter spring 13. The diaphragm 11 extends radially out to the circular wall of the casing 2 to which its outer margin is also tightly fixed. This is done in this example by suitably pressing the thicker margin 14 of the diaphragm 11 into a circular recess of the casing 2. In close contact with the external (low pressure) surface of the diaphragm 11 are a number of radial leaf springs 15 the outer ends of which are rigidly pressed against the end face 16 of a larger recess of the casing 2 by means of the spigot 17 of the cover 18. The inner ends of the springs 15 are loosely accommodated in a circular space between the diaphragm 11 and a small shoulder 19 of the ring 8, 9. As shown in FIG. 2 the radial leaf springs 15 may be formed by cutting or stamping narrow radial slots 20 out of a ring 21 of spring steel.

It will be seen from the above description that the springs 15 are uniformly loaded by the fluid pressure obtaining in the space 3, via the diaphragm 11, the latter providing the fluid-tight connection between the casing 3 and the axially movable ring 7, 8, 9. The diaphragm 11 has to be sufficiently strong to be capable of bridging, under pressure, the gaps 20 which, in turn, should be as narrow as possible. Then the diaphragm 11 can be made so thin that its elastic properties do not influence the system. These properties are therefore exclusively determined by the shape and the thickness of the springs 15 as well as by the physical properties of the spring material.

The acting forces are more clearly indicated in FIG. 3 which represents a diagram of the effect underlying the design of the seal according to the invention. As the diaphragm 11 is presumed to bear no influence on the system it is not shown in this diagram. Each spring 15 can be considered as an elastic beam rigidly fixed at its outer end between the parts 2 and 18 supported at its free end by the shoulder 19 of the sleeve 9. When uniformly loaded by the fluid pressure $p$ the elastic deformation (deflection) of the spring 15 will be approximately as shown in an exaggerated scale. As the length $l$ and the variable width $b$ of the spring (see FIG. 4) are given the thickness required to withstand the working pressure, $p$ can be determined. Also the supporting forces $F_1$ and $F_2$ can be calculated, the former being of less practical interest, but $F_2$ is the force which would also act upon the two co-operating sliding surfaces if the ring 7 were to have the same diameter as the hub 9. For medium and higher pressure $p$ it will be desirable to reduce the contact pressure, and this is done by adding the flange portion 8 to the hub 9 and by fixing the sealing ring to the periphery of this flange. Then, the fluid pressure acting upon the right hand side of the flange portion 8 opposes the force $F_2$ so that the resulting contact pressure C is the difference between $F_2$ and the pressure load on the flange 8. As the force $F_2$ is known the radial width $r$ of the flange 8 can be so determined that any desired contact pressure C is obtainable by more or less balancing the force $F_2$.

It is a very favourable feature in this design that, due to the rigid fixing of the outer ends of the leaf springs 15, and in consequence of their tapered shape in the face view the supporting force $F_2$ is considerably smaller than $F_1$. Therefore a relatively small portion of the total pressure load on the springs need be balanced by the counterpressure on the flange 8 so that the radial extension $r$ of the latter can be considerably smaller than the length $l$ of the leaf springs 15.

Following common practice a certain pre-loading is applied by the springs 15 to the relatively rotating sealing members 7 and 5 so that they remain in close contact while no fluid pressure is present.

In order to ensure the correct flexibility of the springs their fixed ends are supported along straight lines as indicated in FIGS. 3 and 4 by reference number 22. When a large number of narrow springs are used as shown in FIG. 2 a circular line 22 may be acceptable instead as the supporting section for each spring deviates very little from a straight line. However, a large number of radial slots are not desirable for higher pressures, and when applying a small number of wider springs as shown in FIG. 5 the supporting line 22 should be a polygon, the radial slots 20 matching with its corners. The shape of the shoulder 19 supporting the inner ends of the leaf springs is of lesser importance. In FIG. 2 the shoulder 19 has a circular shape. In FIG. 5 it is formed as a polygon in connection with the wider springs.

The axially movable seal ring 7, 8, 9 is held in its radial position relative to the shaft 1 by the inner edges of the leaf springs 15 which loosely touch the outer cylindrical surface of the hub 9, see FIGS. 1, 2 and 5.

Means are provided to prevent rotation of the ring 7, 8, 9 under the influence of friction between the surface 6 and the sealing ring 7. By way of example the cover 18 is fitted with a radial rib 23 which extends into a radial groove 24 at the periphery of the flange 8, see FIGS. 1, 2 and 5.

The features of the invention shown in FIG. 1 have been applied in FIG. 6 to a centrifugal pump. Let 25 be a part of the impeller shroud, then the pressurised fluid occupies the space 26 between the shroud 25 and the pump casing 27. As compared with FIGS. 1 and 3 the pressure now acts in the opposite direction upon the leaf springs 15 and the flange 8. Therefore the flexible diaphragm 11 is situated at the right hand side of the springs 15, and the shoulder supporting the ends of the springs 15 is represented by a spring ring 28 fixed in a groove at the outer end of the hub portion 9. It will be seen that, in this arrangement, the pressure acting upon the springs 15 will tend to lift the seal ring 7 off the cooperating contact face 6. This is prevented by determining the radial extension of the flange 8 so that the spring load is overbalanced, and a positive contact pressure of the desired magnitude is obtained.

In FIGS. 7 and 8 a seal according to the invention is shown applied to a rotary union which serves to prevent leakage when conveying a fluid through a stationary duct into a rotary machine. The pipe 29 which may be part of the rotary machine is supported by bearings one of which is indicated by reference number 30. The bearings are accommodated in a stationary casing 31 to which is fixed a cover 32. The latter includes a section 33 of the stationary fluid duct. In this example the seal shows some modifications the purpose of which is to ensure an easy manufacture and an improved assembly. Another object of this design is to improve the flexibility of the springs by using two layers 34, 35. The layer 35 is situated at the low pressure side and it supports the main spring 34 in the region of the highest bending moments only. The outer ends of the springs are rigidly fixed between two strong rings 36, 37 the latter being pressed into a cylindrical recess of the former and secured by rolling the outer edge 38 of the recess against a chamfer of the ring 37. The flexible diaphragm 39 is provided with an outer margin 40 of a conical shape which fits into a corresponding groove of the ring 37. The tight connection is obtained by rolling or pressing the thin outer wall 41 of the groove against the margin 40. The inner cylindrical edge 44 of the diaphragm 39 is tightly fixed to the hub portion 42 of the ring 43 by means of a spring ring or a hose clip 45. The supports of the outer ends of the springs 34, 35 along straight lines 46 (FIG. 8) are ensured by small cylindrical needles 47 as used in needle bearings. The needles are located in a circular groove 48 of the ring 36. This arrangement ensures a very accurate support of the springs without requiring any difficult machining. The ring 43 is secured against rotation by one or two elongated leaf springs 49 (FIG. 8) the inner ends of which bear against flat faces 50 at the outer surfaces of the hub portion 42. It will be seen from the above description that the new seal can be manufactured as a separate and self-contained unit which is suitably accommodated, in this example, in a recess of the cover 32. The central bore of the ring 43 forms a part of the fluid passage in this application.

The flexibility of the system can be further increased by replacing the single set of leaf springs by a bank (i.e., a larger number of layers) of very thin springs.

Another means yielding an improvement in this respect is to arrange a number of sets of springs in series, thus arriving at a design which could be called a "compound" embodiment of the invention. FIG. 9 is a diagrammatic drawing of a compound seal including three sets of springs, through any larger number of sets could be used if required. Each set of springs 51, 52, 53 and the adjacent diaphragms 54, 55, 56 are fixed at their outer ends and formed at their inner ends basically in the same way as shown in FIG. 1. Following the principle underlying this type of seal the first set of springs 51 with its diaphragm 54 are fixed to a ring which is located between the casing 2 and the cover 18, this ring consisting, by way of example, of two sections 57, 58 held together by rivets 59. A soft seal ring 60 prevents any leakage along the contacting surfaces of the casing 2 and the ring 57/58. The inner ends of the springs 51 and 52 and the inner edges of the diaphragms 54 and 55 are connected with the axially movable ring 61 while the outer ends of the second and third sets of springs 52, 53 and their diaphragms 55, 56 are tightly fixed in another axially movable ring which is formed, by way of example, of three components 62, 63 and 64. This arrangement of springs and diaphragms can be repeated as often as required but in this example the inner edges of the third set of springs 53 and the diaphragm 56 are connected as in FIG. 1, with the axially movable seal ring viz., to the hub portion 9 of the ring 8 which carries the seal ring 7. It is advisable to give the outer ring a radial support, and for this purpose its section 62 is provided with a narrow flange 65 fitting loosely in the cylindrical section 66 of the cover 18. The fluid pressure in the spaces 3 acts upon each set of springs in the same way as shown in FIG. 3. It will be seen that the forces $F_2$ of the first two sets of springs 51, 52 balance each other, and so do the forces $F_1$ of the second and third set of springs 52, 53. The final force $F_2$ of the springs 53 is more or less balanced, as required, by the fluid pressure acting upon the end face of the ring 7, 8, 9. Thus, the contact pressure between the cooperating members 7 and 5 can be determined in the same way as for the simple seal (FIG. 1) but the axial flexibility expressed by the axial displacement (inches) per pound of contact pressure is "$n$" times as large as that of the simple seal, "n" indicating the number of sets of springs used.

FIG. 10 shows an example of a compound seal with two sets of springs 51, 52 and diaphragms 54, 55 the seal being applied to a rotary pump or compressor, similar to FIG. 6. Fluid pressure therefore obtains in the space 26 between the impeller shroud 25 and the casing 27, and also in the space 67 which communicates with 26. Again the first set of springs 51 and the diaphragm 54 are rigidly fixed to the stationary ring 57, 58 while the outer ends of the springs 52 and the diaphragm 55 are fixed between two rings 68, 69 rigidly fixed to each other in a suitable way. The ring 69 extends radially inwards and carries near its inner edge the seal ring 7. The two diaphragms 54, 55 are made integral with a cylindrical section 70 so that no special fixing of the inner edges of the diaphragms to the ring 71 is needed. Considering now the acting forces it will be seen that the forces $F_2$ (see FIG. 3) of the springs 51, 52 bearing against the shoulder 72 and the spring ring 73, respectively, balance each other. The contact pressure can be determined, in this example, as the difference between the force $F_1$ of the spring 52 bearing upon the outer edge of the ring 69 and the counteracting pressure load on the end face of the ring 69.

It will be understood that in these compound seals each set of springs may consist of a number of thin layers which means a further increase in the flexibility. Furthermore the improved constructional details shown in FIGS. 7 and 8 can be applied.

I claim:

1. A rotary contact seal for sealing relatively rotatable members comprising co-operating relatively rotatable seal rings which make sliding contact with one another, one of the said rings being an axially movable seal ring, spring means comprising at least one circumfeerntial set of truncated sector-like leaf spring edgewise spaced from one another only by narrow gaps, said springs controlling said axially movable seal ring, rigid means rigidly clamping the outer region of said spring means as in a vice, said springs having their inner ends free so that they can act like beams fixed at one end, the inner free ends of the springs radially supporting the axially movable seal ring, means for axially locating said free inner ends of the springs in both directions in relation to the axially movable seal ring but so that they are free relatively to the said ring, the axially movable seal ring having a face responsive to axial fluid pressure to oppose fluid pressure transmitted thereto through the springs so that the contact pressure between the rings is controlled by the difference between the two opposing pressures, and diaphragm sealing means facially supported by the said springs and serving to bridge the said gaps for sealing the said axially movable seal ring to one of the said members and being so flexible relative to the springs as to leave the control of the elastic flexibility of the seal substantially to the said springs.

2. A rotary contact seal according to claim 1, in which the axially movable ring comprises at least one flat face and the free inner edge of at least one said spring is provided with a linear edge co-operating with said face to prevent relative turning between the said ring and the springs.

3. A rotary contact seal according to claim 1, in which said rigid means comprises two opposing rigid metallic clamping elements directly clamping said outer regions of the springs, one said element having tangential inner bearing supports for the outer regions of the flexing portions of the springs.

4. A rotary contact seal according to claim 1, in which the said rigid means comprises two opposing rigid clamping elements, one said element having a polygonal inner edge forming tangential bearing supports for the outer ends of the flexing portions of said springs.

5. A rotary contact seal according to claim 1, comprising bearing supports for the outer ends of the flexing portions of the springs, said bearing supports being provided by a polygonally arranged series of cylindrical elements.

6. A rotary contact seal according to claim 1, comprising bearing supports for the springs and means stiffening the springs at their outer regions and co-operating with the said supports.

7. A rotary contact seal according to claim 1 wherein the inner free ends of the springs radially support the axially movable seal ring by means of a second circumferential set of truncated sector-like leaf springs edgewise spaced from one another by only narrow gaps, said second set of springs being spaced axially between said axially movable seal ring and said first seal ring and said first set of springs and said second set of springs being fixed at the radially outer region thereof to said axially movable seal ring; said seal further including tubular means joining the radially inner region of said second set of springs to the radially inner region of said first set of springs and diaphragm sealing means facially supported by said second set of springs serving to bridge the said narrow gaps between the springs of said second set; and wherein the means for axially locating said inner ends of the springs in both directions in relation to the axially movable seal ring comprises means defining an axially elongated annular ring engaging the radially inner peripheral surface of said tubular joining means and means defining radially outward projections on said annular ring, said projections engaging said diaphragms adjacent the inner regions of said first and second spring sets.

8. A rotary contact seal according to claim 1 having an odd number more than one of said spring sets each with a cooperating sealing diaphragm, interconnected by and sealed to further axially movable rings so that the inner free ends of the springs radially support inner axially movable rings, one of which is the axially movable seal ring and the outer ends of the springs are fixed to at least one outer axially movable ring save for the end set remote from that radially supporting the inner movable seal ring, which set is fixed to the said one of said members.

9. A rotary contact seal according to claim 1, constructed so that the fluid pressure applied through the springs acts to reduce the contact pressure and the said opposing fluid pressure acts to maintain the contact pressure.

10. A rotary contact seal according to claim 1 in which the inner periphery of the diaphragm is flanged and held by a retaining ring on the axially movable ring.

11. A rotary contact seal according to claim 1 having a number of said spring sets more than two, each set being associated with a co-operating diaphragm, said sets being interconnected by and sealed to consecutive inner and outer rings and the last said ring carrying the axially movable member.

References Cited by the Examiner
UNITED STATES PATENTS

| | | | |
|---|---|---|---|
| 2,608,425 | 8/52 | Krug | 277—89 XR |
| 2,672,360 | 3/54 | Chambers et al. | 277—40 |
| 2,699,366 | 6/55 | Heinrich | 277—90 |
| 2,866,656 | 12/58 | Dobrosavljevic | 277—90 |
| 2,984,507 | 5/61 | Welch | 277—27 |

EDWARD V. BENHAM, *Primary Examiner.*

W. A. SCHEEL, SAMUEL ROTHBERG, *Examiners.*